US009549409B2

(12) United States Patent
Lorca Hernando

(10) Patent No.: US 9,549,409 B2
(45) Date of Patent: Jan. 17, 2017

(54) METHOD FOR CANCELLING DOWNLINK INTERFERENCE IN A LTE-ADVANCED NETWORK

(71) Applicant: TELEFONICA, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 93 days.

(21) Appl. No.: 14/409,687

(22) PCT Filed: Jun. 3, 2013

(86) PCT No.: PCT/EP2013/061403
§ 371 (c)(1),
(2) Date: Dec. 19, 2014

(87) PCT Pub. No.: WO2013/189728
PCT Pub. Date: Dec. 27, 2013

(65) Prior Publication Data
US 2015/0195841 A1 Jul. 9, 2015

(30) Foreign Application Priority Data
Jun. 21, 2012 (ES) .................................. 201230978

(51) Int. Cl.
H04B 7/00 (2006.01)
H04W 72/08 (2009.01)
H04J 11/00 (2006.01)

(52) U.S. Cl.
CPC ........ *H04W 72/082* (2013.01); *H04J 11/0053* (2013.01)

(58) Field of Classification Search
CPC ............. H04W 72/042; H04W 72/082; H04W 72/1215
USPC ................. 370/310, 328, 329, 338
See application file for complete search history.

(56) References Cited

U.S. PATENT DOCUMENTS 8,873,467 B2 * 10/2014 Dinan ................. H04L 27/2649
370/328
8,897,182 B2 * 11/2014 Yoon ................. H04W 72/0446
370/286

(Continued)

FOREIGN PATENT DOCUMENTS

WO 2011/162395 A1 12/2011

OTHER PUBLICATIONS

David Lopez-Perez, et al., "Enhanced Intercell Interference Coordination Challenges in Heterogeneous Networks", IEEE Wireless Communications, Jun. 2011, pp. 22-30.

(Continued)

Primary Examiner — Dmitry H Levitan
(74) Attorney, Agent, or Firm — Sughrue Mion, PLLC

(57) ABSTRACT

The method comprising at least one user device provided with at least four antennas, wirelessly connected to a serving base station having between one and four transmit antennas and suffering interferences from at least one interfering base station having between one and four transmit antennas, establishing a data transmission link among a plurality of antennas, and:

applying a time shift delay between said serving base station and said at least one interfering base station in order to avoid collision between Cell Reference Signals (CRS) of serving and interfering base stations when said data transmission is established; and introducing changes on the physical layer for PDSCH transmission and reception aimed at achieving interlayer interference cancellation, said changes introduced comprising the introduction of a pattern of transmission gaps at symbols (l) and subcarrier indices (k) of inter- (Continued)

fering cell's CRS signals, which will be exploited by said at least one user device for effective interference cancellation.

10 Claims, 14 Drawing Sheets

(56) References Cited

U.S. PATENT DOCUMENTS

| | | | | |
|---|---|---|---|---|
| 8,995,400 | B2* | 3/2015 | Geirhofer | H04B 7/0626 370/252 |
| 9,008,675 | B2* | 4/2015 | Seo | H04J 11/005 455/418 |
| 9,054,842 | B2* | 6/2015 | Bhattad | H04L 5/005 |
| 9,066,240 | B2* | 6/2015 | Sadek | H04W 16/14 |
| 2010/0208854 | A1 | 8/2010 | Guess et al. | |
| 2010/0309867 | A1 | 12/2010 | Palanki et al. | |
| 2012/0315859 | A1* | 12/2012 | Lee | H04J 11/005 455/67.13 |
| 2013/0090127 | A1 | 4/2013 | Nishikawa et al. | |
| 2013/0142138 | A1* | 6/2013 | Dinan | H04W 72/04 370/329 |
| 2013/0190006 | A1* | 7/2013 | Kazmi | H04W 64/006 455/456.1 |
| 2015/0181583 | A1* | 6/2015 | Siomina | H04W 16/14 370/330 |

OTHER PUBLICATIONS

International Search Report of PCT/EP2013/061403, dated Aug. 9, 2013. [PCT/ISA/210].

3GPP TS 36.300, Evolved Universal Terrestrial Radio Access (E-UTRA) and Evolved Universal Terrestrial Radio Access Network (E-UTRAN); Overall Description, Stage 2 (Release 8), 149 pages, Mar. 2010.

A. Damnjanovic et al, "A Survey on 3GPP Heterogeneous Networks", IEEE Wireless Communications, Jun. 2011, pp. 10-21.

J. Ketonen and M. Juntti, "SIC and K-BEST LSD receiver implementation for a MIMO-OFDM System," Proc. European Signal Processing Conference, 2008, 5 pages.

3GPP TR 36.921 v10.0.0, Evolved Universal Terrestrial Radio Access (E-UTRA); FDD Home eNode B (HeNB) Radio Frequency (RF) requirement analysis (Release 10), 45 pages, May 2011.

D. López-Pérez et al, "Enhanced Intercell Interference Coordination Challenges in Heterogeneous Networks", IEEE Wireless Communications, Jun. 2011, pp. 22-30.

3GPP TSG RAN R1-106186, "Control Channel ICIC for macro-femto deployments", NTT Docomo, Nov. 2010, 11 pages.

S. Sesia, I. Toufik, M. Baker (editors), "LTE, the UMTS Long Term Evolution: From Theory to Practice", John Wiley & Sons, 2009, 795 pages.

"MIMO Performance and Condition Number in LTE Test", Agilent Technologies, Application Note, 14 pages, 2009.

3GPP TS 36.211, Evolved Universal Terrestrial Radio Access (E-UTRA); "Physical Channels and Modulation (Release 10)," 101 pages, Jun. 2012.

3GPP TS 36.212, Evolved Universal Terrestrial Radio Access (E-UTRA); "Multiplexing and Channel Coding (Release 10)," 79 pages, Jun. 2012.

A. Rüegg, A. Tarable, "Iterative SIC receiver scheme for non-orthogonally superimposed signals on top of OFDMA", IEEE 21st International Symposium on Personal Indoor and Mobile Radio Communications (PIMRC), Sep. 2010, pp. 156-161.

* cited by examiner

METHOD FOR CANCELLING DOWNLINK INTERFERENCE IN A LTE-ADVANCED NETWORK

CROSS REFERENCE TO RELATED APPLICATIONS

This application is a National Stage of International Application No. PCT/EP2013/061403 filed Jun. 3, 2013, claiming priority based on Spanish Patent Application No. P201230978, filed Jun. 21, 2012, the contents of all of which are incorporated herein by reference in their entirety.

FIELD OF THE ART

The present invention generally relates to wireless communications, and more particularly to a method for cancelling downlink interference in a LTE-Advanced Heterogeneous Network.

PRIOR STATE OF THE ART

Long-Term Evolution (LTE) is the next step in cellular 3G systems, which represents basically an evolution of the actual mobile communications standards, such as UMTS and GSM [1]. It is a 3GPP standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility).

As the spectral efficiency of a point-to-point link in cellular networks approaches its theoretical limits, there is a need for an increase in the node density to further improve network capacity. However, in already dense deployments in today's networks, cell splitting gains can be severely limited by high inter-cell interference.

An alternative approach involves the deployment of low power nodes overlaid within a macro network, creating what is referred to as a heterogeneous network (commonly known as "HetNet"). HetNets consist of a mix of macrocells, remote radio heads, and low-power nodes such as picocells, femtocells, and relays. Increasing the proximity between the access network elements and the end users has the potential to dramatically increase overall throughput and spectrum efficiency per square km. However, major technical challenges appear when deploying a heterogeneous network operating at a single frequency.

Interference management techniques are critical for LTE heterogeneous deployments, and cell range expansion, enabled through cell biasing and adaptive resource partitioning, is seen as an effective method to balance the load among the nodes in the network and improve overall trunking efficiency [2]. An interference cancellation receiver plays a crucial role in ensuring acquisition of weak cells in the presence of legacy macro transmissions.

Several interference-rejection mechanisms are receiving a considerable attention in recent years, both in 3GPP and the scientific community. One scheme is referred to as Successive Interference Cancellation (SIC), by which an advanced receiver performs an iterative procedure to detect and cancel one or more interfering sources [3]. Parallel Interference Cancellation (PIC) schemes are very similar to SIC schemes, performing a recursive interference cancellation across several correlated subbands and several receive antenna elements, and being again computationally very expensive [4].

Other solutions describe in a general way procedures involving interference estimation and cancellation of CRS, control and data channels; in an iterative way (patent application US 2011/0267937). These solutions do not address the problem of collision between interfering CRS and control/data serving channels (and vice versa), considering only iterative schemes that partially remove interference by successive estimation, reconstruction and subtraction from the original signal. They are thus derived from SIC architectures, therefore presenting similar drawbacks.

Solutions involving dynamic power/rate adjustment are also investigated in patent application US 2010/0009634, in which feedback is required between victim UEs and serving and interfering base stations. These solutions have the drawback of requiring complex feedback links towards all nodes under consideration. Additionally, there always exists a minimum control channel power below which demodulation is impossible, and this restricts the effectiveness of these proposals.

A considerable standardization activity is also being carried out in 3GPP, regarding enhanced inter-cell interference coordination/cancellation [5]. Several mechanisms are being studied both for control channels interference mitigation (PSS, SSS, PDCCH, PCFICH, PHICH and PBCH) and for data channel (PDSCH) protection. While control channel protection can be addressed through time/frequency shifting and power setting [7], proposals for data channel protection involve complex frequency partition mechanisms, such as dynamic distributed Fractional Frequency Reuse (FFR), and even dynamic changes of CSG ID [5]. These techniques, in addition of being considerably complex, require in some cases the existence of centralized coordination nodes, and are far from being thoroughly studied.

Enhanced ICIC techniques (known as "eICIC" in the context of LTE-Advanced) currently involve time partitioning of subframes, introducing the so-called ABSFs (Almost Blank Subframes). In the ABSFs, no control or data signals are transmitted and only reference signals are present for channel estimation, as shown in FIG. 1 in the context of a co-channel deployment of macrocells and femtocells.

In this scheme, a macro UE in the vicinity of a femtocell may be scheduled within the subframes overlapping with the ABSFs of the femtocell, significantly removing intercell interference [6]. The existence of ABSFs implicitly requires tight time synchronization between cells, on top of the usual frequency synchronization.

Problems with Existing Solutions:

The main drawback with SIC receivers is the requirement of a large difference between the desired and interfering powers, being thus unsuitable when dealing with similar received power levels (as is often encountered in cell-edge conditions with geometry values close to 0 dB) [12]. They also demand large computational capabilities from the UE's receiver.

Enhanced ICIC techniques based on ABSFs alleviate interference at the expense of a reduced capacity, due to the existence of subframes without PDSCH data. Moreover, inter-layer coordination demands the existence of X2 interface between the cells from different layers, with the purpose of exchanging dynamic coordination information. X2 interface is only optional and in some cases very difficult to implement (as happens e.g. in femtocells). In addition, removal of CRS interference additionally demands interference cancellation capabilities in the UE, as mentioned for SIC/PIC receivers.

Control channel interference may also be dramatically reduced through time/frequency shifting and sparse PDCCH, in order to avoid collisions between control channels of macro and micro/pico/femto cells [7]. A time shift of 16 OFDM symbols (equivalent to one subframe plus two symbols) is particularly attractive, as depicted in FIG. 2 for the context of interference between macro-eNB and Home-eNB (femtocell). This time shift can be combined with attenuation or muting of the PDSCH REs which are overlapping with the other cell's control channels [5].

However, fundamental issues still remain with respect to PDSCH interference cancellation, which cannot be easily accomplished without a complex interaction between layers. The patent application "A method to minimize inter-cell interference in a LTE deployment" dealt with this problem, but had the limitation of considering only single-antenna transmissions. As no time synchronization between cells is considered, coherent estimation of the interference is not possible when dealing with more than one TX antenna, which is a common situation especially in femtocells. Moreover, cell coordination is assumed so as to ensure that no multi-antenna transmission takes place, thus requiring the existence of X2 interface and a common coordination strategy which, in the case of femtocells, is very difficult to assume.

SUMMARY OF THE INVENTION

It is necessary to offer an alternative to the state of the art which covers the gaps found therein, particularly those related to the lack of proposals which allow the application of more simple and effective interference mitigation schemes, not requiring excessive computational resources in the UE.

To that end, the present invention provides a method for cancelling downlink interference in a LTE-Advanced network, comprising at least one user device provided with at least four antennas, wirelessly connected to a serving base station having between one and four transmit antennas and suffering interferences from at least one interfering base station having between one and four transmit antennas, establishing a data transmission link among a plurality of antennas.

On contrary to the known proposals, the method of the invention comprises:
  applying a time shift delay between said serving base station and said at least one interfering base station in order to avoid collision between Cell Reference Signals (CRS) of serving and interfering base stations when said data transmission is established; and
  introducing changes on the physical layer for PDSCH transmission and reception aimed at achieving inter-layer interference cancellation, said changes introduced comprising the introduction of a pattern of transmission gaps at symbols (l) and subcarrier indices (k) of interfering cell's CRS signals, which will be exploited by said at least one user device for effective interference cancellation.

The serving base station and the at least one interfering base station are time-synchronized with a relative time shift of one subframe plus two OFDM symbols.

In addition, the serving base station knows the number of the transmit antennas and the physical cell identity of the interfering base station ($N_{ID}^{int\ erf}$) in order to apply the appropriate pattern of gaps on a subset of the resource blocks reserved for a particular user device ($N_{RB}$). The appropriate pattern of gaps is applied depending on the number of transmit antennas of the interfering base station.

The serving base station receives a serving and an interfering quality measurement report such as a RSRP and a RSRQ from said at least one user device, and knows the number of transmit antennas and the physical cell identity of the interfering base station in order to apply the appropriate pattern of gaps.

The time shift delay applied in the method is a relative time shift of one subframe plus two OFDM symbols, and in an embodiment, is applied over all the antennas of the serving base station and the interfering base stations.

In another embodiment, the UE sends the number of transmit antennas and the physical cell identity of the interfering base station, and after being scheduled the UE exploits the pattern of gaps applied by the serving cell for interference cancellation.

Finally, the serving base station and the at least one interfering base station can be either a macrocell or a small cell. In what follows the term "femtocell" will be considered completely equivalent to "small cell".

Other embodiments of the method of the present invention are described according to appended claims and in a subsequent section related to the detailed description of several embodiments.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

The present invention provides a method that deals with the problem of LTE-A downlink interference mitigation for data channels in heterogeneous deployments comprising a mixture of macrocells and micro/pico/femto cells (commonly known as "small cells"). Interference between femtocells is not addressed in this proposal.

Considering the case of an LTE-A UE with at least four antennas (which is the baseline capability for LTE-A terminals), the present invention introduces changes in the physical transmissions of both macro cells and small cells, so that multi-antenna UEs are able to mitigate PDSCH interference. The proposed invention assumes that the maximum number of transmit antennas is four in all eNodeB's. Although in LTE-A the eNodeB is able to transmit with up to eight TX antennas, the application of the proposed invention would require an excessive number of RX antennas in the UE. Hence, a maximum of four TX antennas in the eNodeB is required. In what follows, small cells will be commonly denoted as "femtocells" (or Home-eNB) for the sake of clarity, although the proposed invention is applicable to any kind of small cell.

Figure 3:
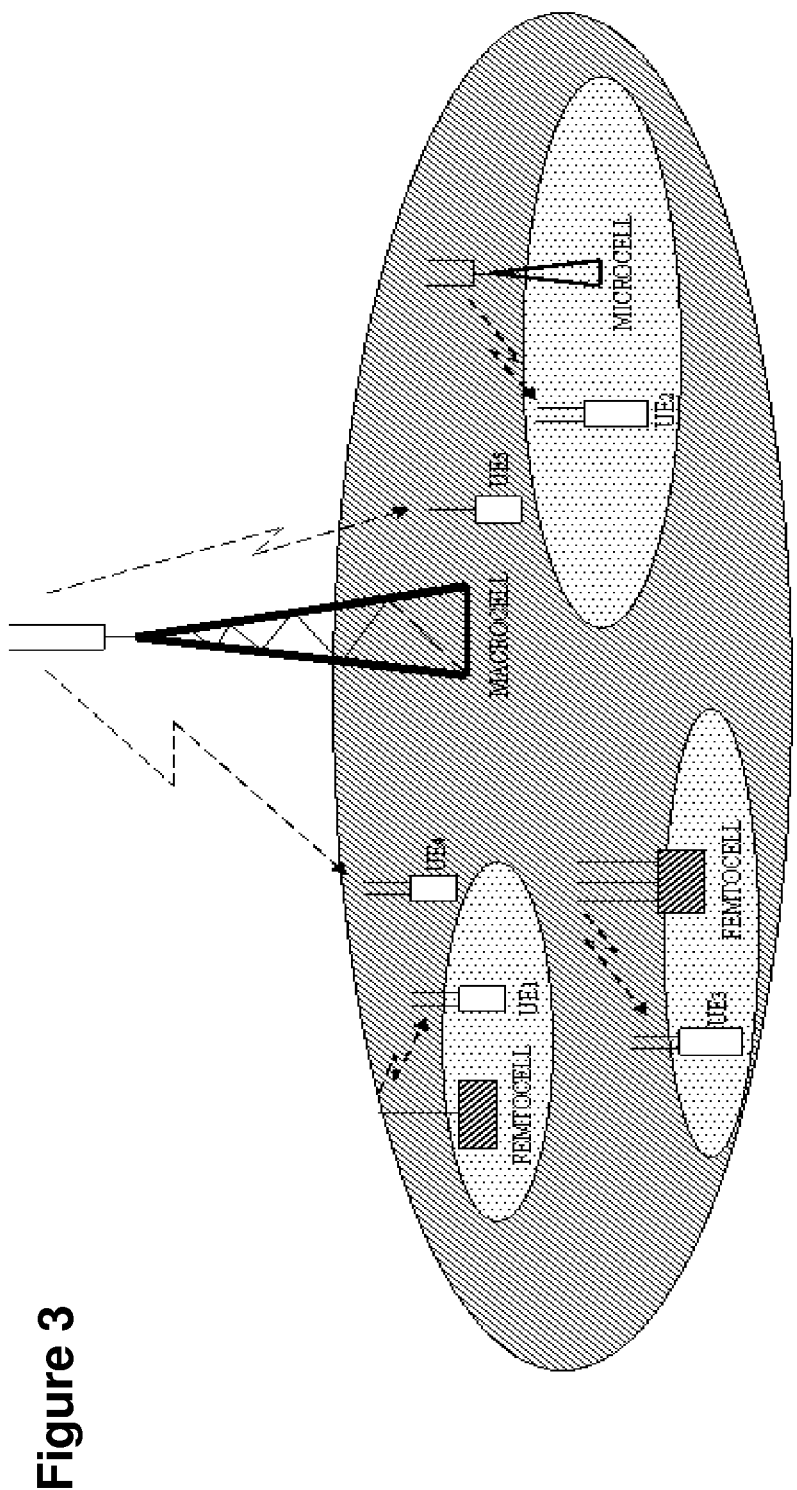
FIG. 3 shows the scenario under study in the present invention, comprising one or several small cells randomly deployed under the coverage of a common macrocell, according to an embodiment.

The scenario under study is depicted in FIG. 3. One or several micro/pico/femto cells are randomly deployed under the coverage of a common macrocell. UEs connected to the macrocell suffer from a heavy interference near the femtocell. These users may experience a radio link failure, thus appearing a "coverage hole" around the femtocell. Similarly, as cell range expansion (CRE) is usually applied for the femtocells [2], femto users in cell-edge conditions may experience heavy interference from the macrocell.

Figure 1:
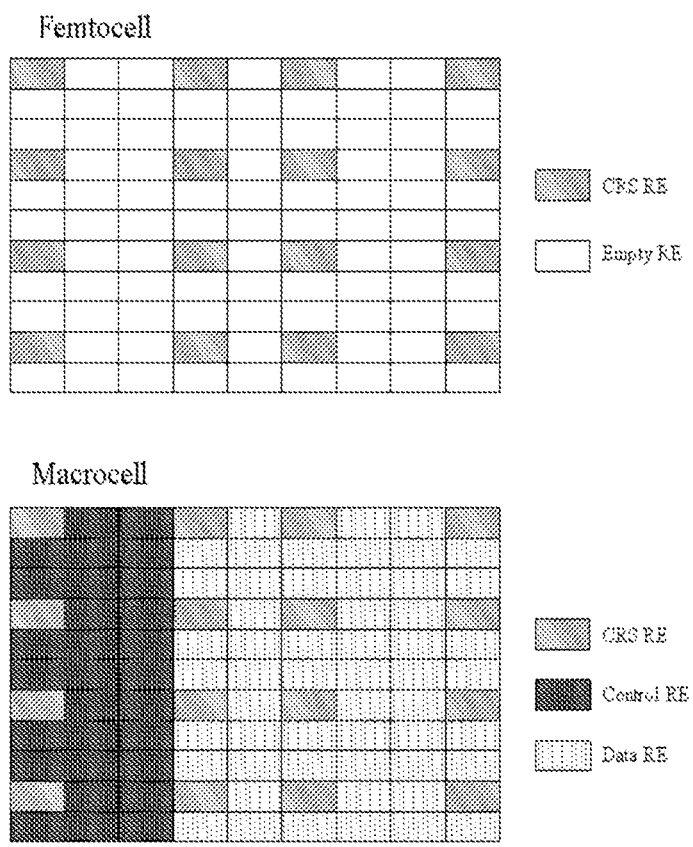
FIG. 1 shows an example of a co-channel deployment of macrocells and femtocells introducing the Almost Blank Subframes (ABSFs) concept.
Figure 2:
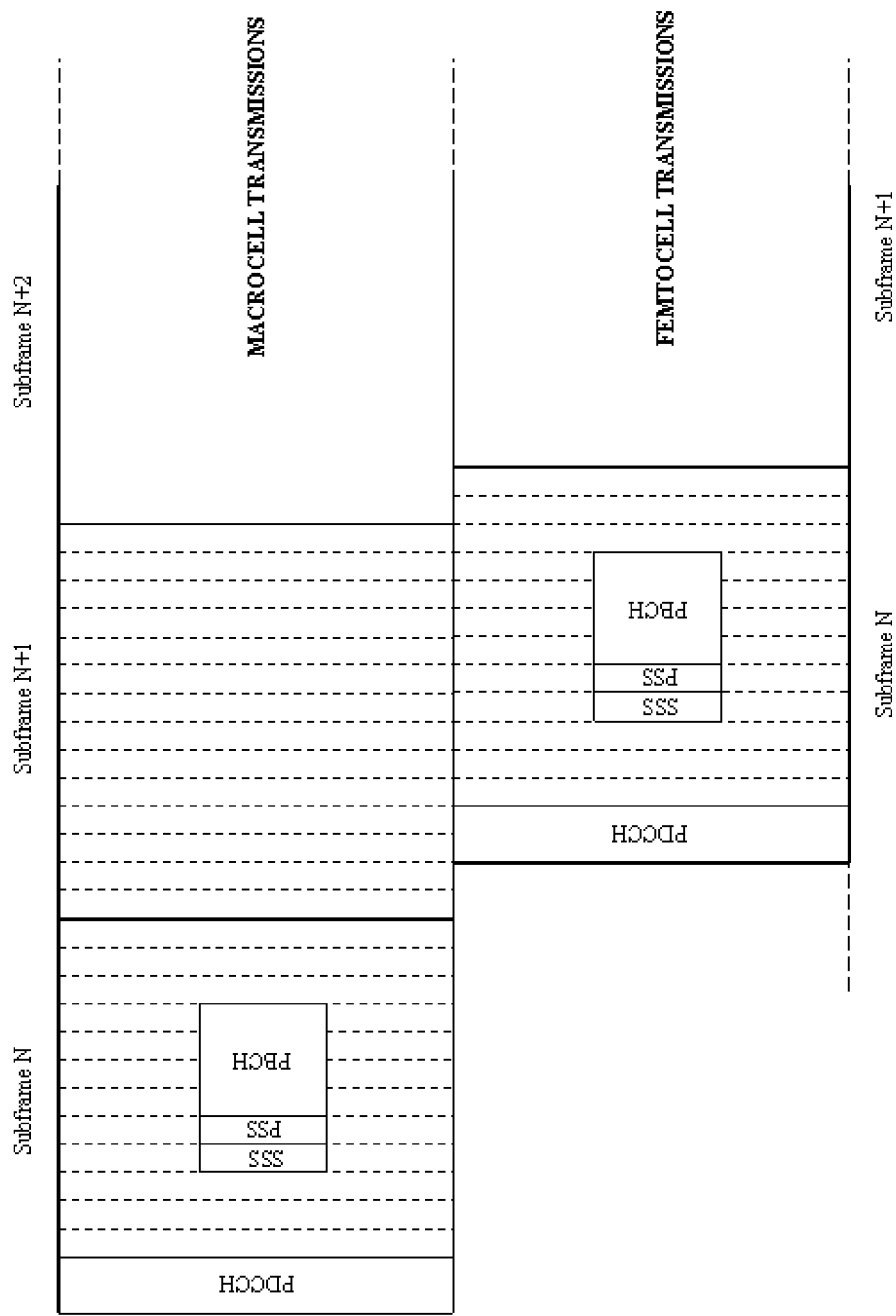
FIG. 2 shows an example of a time shift of 16 OFDM symbols used between macrocells and femtocells.

In order to mitigate control channel interference between macro and femtocells, a time shifting of 16 OFDM symbols is assumed, as in FIG. 2. This time shift will be beneficial for the present invention, as will be shown below. Heavy interference between PDSCH REs of macrocell and femtocell is present when the UE is in cell-edge conditions. To overcome this, the present invention introduces changes on PDSCH transmission and reception for inter-layer interference cancellation in two complementary scenarios:

Scenario 1: UE Connected to a Macrocell and Suffering from Femtocell Interference.

A macro UE near a femtocell which is operating in CSG mode experiences a heavy interference. The following changes are proposed:

1. Assuming that the macrocell knows the Physical Cell Identity (PCI) and the number of antennas of the femtocell, it applies DTX (no transmission) over a subset of those REs reserved for the UE which overlap with the femtocell CRS, when a data connection to/from such UE is established. Different femtocells may coexist within the same coverage region of the macrocell, because different DTX patterns may be applied aiming at femtocells with different PCIs.

2. A UE connected to the macro and suffering from femto interference can take advantage of the applied DTX REs and estimate the femtocell channel transfer function(s). Along with the desired macro channel transfer function(s), and with the aid of multiple receive antennas, a combined MIMO scenario formed by the macro, femto and UE is thus established and usual MIMO detection techniques may be applied for correct demodulation of the macro transmissions.

Scenario 2: UE Connected to a Femtocell and Suffering from Macrocell Interference In this case a UE connected to a femtocell suffers from heavy macrocell interference. This scenario is typical of cell range expansion, where biasing of the handover parameters is applied in order to expand the range of the femtocell [2]. The following changes are thus proposed:

3. Assuming that the femtocell knows the PCI and the number of transmit antennas of the macrocell, it applies a DTX pattern over a subset of those REs reserved for the UE which collide with the macrocell CRS, when a data connection is established. The macrocell parameters may be obtained by the femtocell, e.g. through SON-like procedures such as air interface scanning or semi-static configuration via X2 interface (if available).

4. A UE connected to the femtocell can take advantage of the DTX REs and estimate the macro interfering channel transfer function(s), hence constituting a combined MIMO scenario in which the UE can apply MIMO detection techniques and correctly demodulate the signals from the femtocell.

Considering the general case of $N_T^{macro}$ macro antennas and $N_T^{femto}$ femto antennas, a UE with a minimum of $N_T^{macro}+N_T^{femto}$ receive antennas will be able to correctly demodulate the desired signals in the presence of interference. As an example, a macro UE with four receive antennas may cancel interference from a femtocell when both macro and femto are transmitting with up to two antennas (in the REs reserved for that UE). Similarly, a femto UE with only two receive antennas will be able to cancel interference from a macrocell when both macro and femto operate in SISO mode.

Both macrocell and femtocell need to know the other cell's number of transmit antennas and physical cell identity (PCI) in order to apply the appropriate DTX pattern. The relevant parameters may be obtained from measurement reports, air scanning or semi-static configuration, as explained in detail in following sections. If the other cell's number of TX antennas is not known by the serving cell (or is difficult to obtain), it is still possible to apply a DTX pattern corresponding to the worst case of four transmit antennas. This has the advantage of not requiring the UE to report the number of antennas; however, it still has to determine it in order to apply the proposed interference cancellation mechanism.

The advantage of the described scenario is that MIMO detection is more efficient in situations where both desired and interfering power levels are similar. Hence the proposed invention is suitable in situations where the UE geometry values are around 0 dB. Moreover, application of SIC techniques for MIMO detection would allow for interference cancellation even in extreme cases of large CRE values [12].

In what follows, an LTE-A receiver with M receive antennas is assumed in the UE. A heterogeneous network is considered, comprising a macrocell and one or several femtocells.

It is assumed that the cells involved have a maximum of four transmit antennas. In case those cells employ more than four transmit antennas, CRS signals will not be useful for channel estimation and the UE should employ CSI-RS signals instead. It is also assumed that macrocell and femtocells are time-synchronized, and that a relative time shift of one subframe plus two OFDM symbols (16 OFDM symbols) is applied between macro and femto transmissions, in order to alleviate control channel interference [5]. The additional two symbol-offset avoids overlapping of the macro and femto CRS, which will allow for proper estimation of the relevant channel matrices as explained below.

Two different scenarios may be considered: one in which a UE is connected to a macrocell and suffers from femtocell interference (operating in CSG mode), and another in which a UE is connected to a femtocell and suffers from macrocell interference. The UE suffering from interference is denoted to as "victim UE". It is assumed that one or more femtocells may be deployed in the coverage area of the macrocell, and that the femtocells operate in CSG mode thus creating interference over non-CSG-member UEs.

Figure 4:
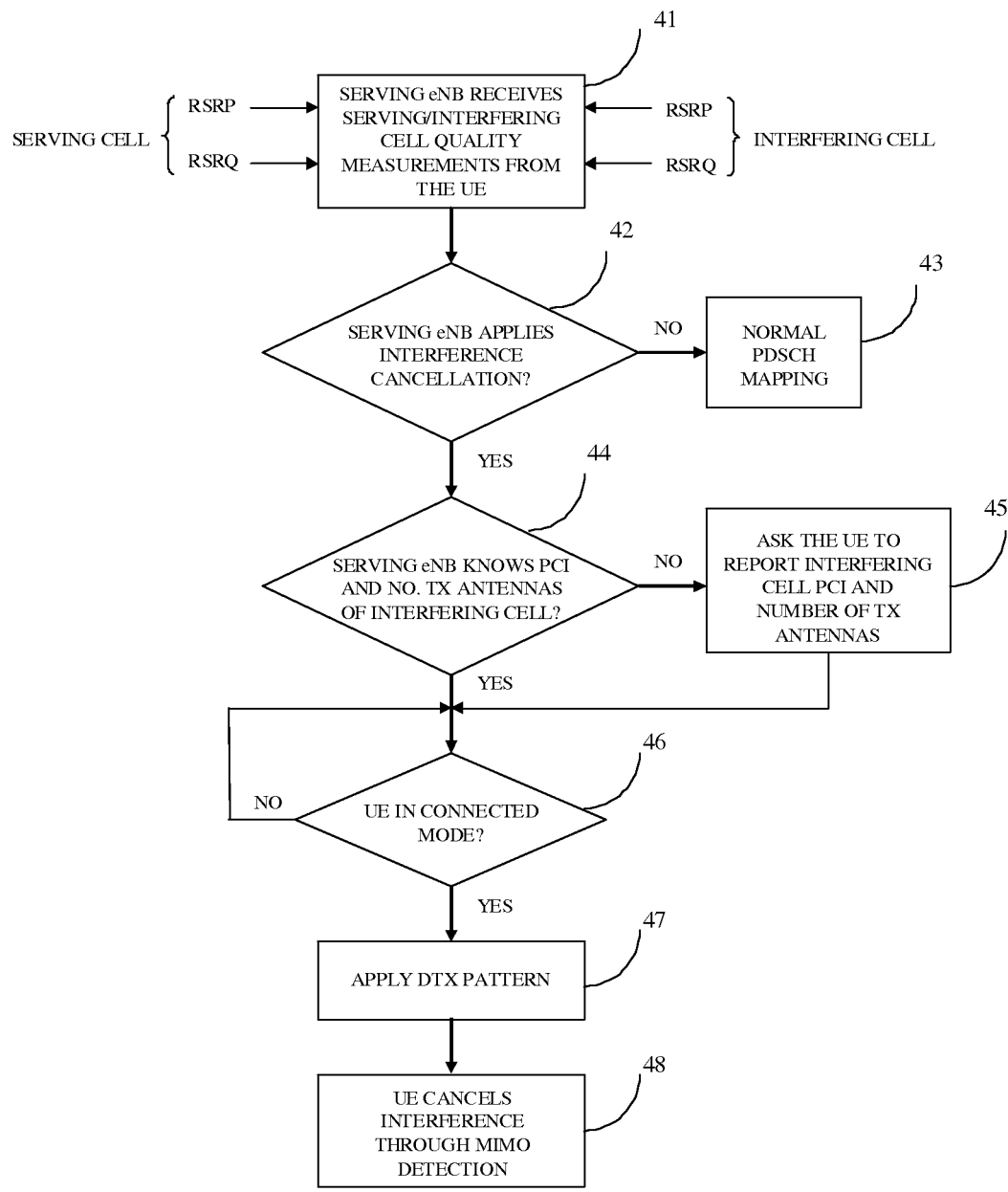
FIG. 4 represents an example of the block diagram of the proposed invention for both scenarios under study.

FIG. 4 graphically depicts the block diagram of the proposed invention for both scenarios under study. In the diagram, the UE is connected to an eNodeB which is denoted as "serving eNB", and suffers from interference from an "interfering eNB".

Block (41) in the serving eNB receives cell quality measurement reports from the UEs, such as RSRP and RSRQ, regarding both serving and interfering cells. Based on these measurements, the serving cell evaluates the need to apply the proposed interference cancellation scheme on a per-UE basis (block 42). The evaluation is not covered by the present invention, and any proprietary solution is considered acceptable; as an example, it may be based on comparison of both serving cell and interfering cell RSRP/RSRQ with predefined thresholds. If the evaluation is negative, normal PDSCH mapping is performed and the invention does not apply (block 43). Otherwise, the serving eNB needs the PCI and number of TX antennas of the interfering cell (block 44); if not yet obtained, the serving eNB asks the UE to report both parameters, through any suitable mechanism (block 45). After knowing those parameters the eNB waits for the UE to enter in RRC connected mode (block 46). When a data connection starts, the serving eNB applies a DTX pattern in those REs reserved for the UE which overlap with the interfering cell CRS (block 47). The UE takes advantage of the gaps in order to estimate the interfering channel and cancel it through proper MIMO demodulation (block 48).

As an alternative to the described procedure, only the interfering cell's PCI may be requested by the serving cell in block 45, and a worst-case DTX pattern (corresponding to the case of four TX antennas) is applied. The PCI is included in usual measurement reports sent by the UE for handover or cell reselection [8]. This alternative thus requires simpler operation because no additional report is needed.

Figure 5:
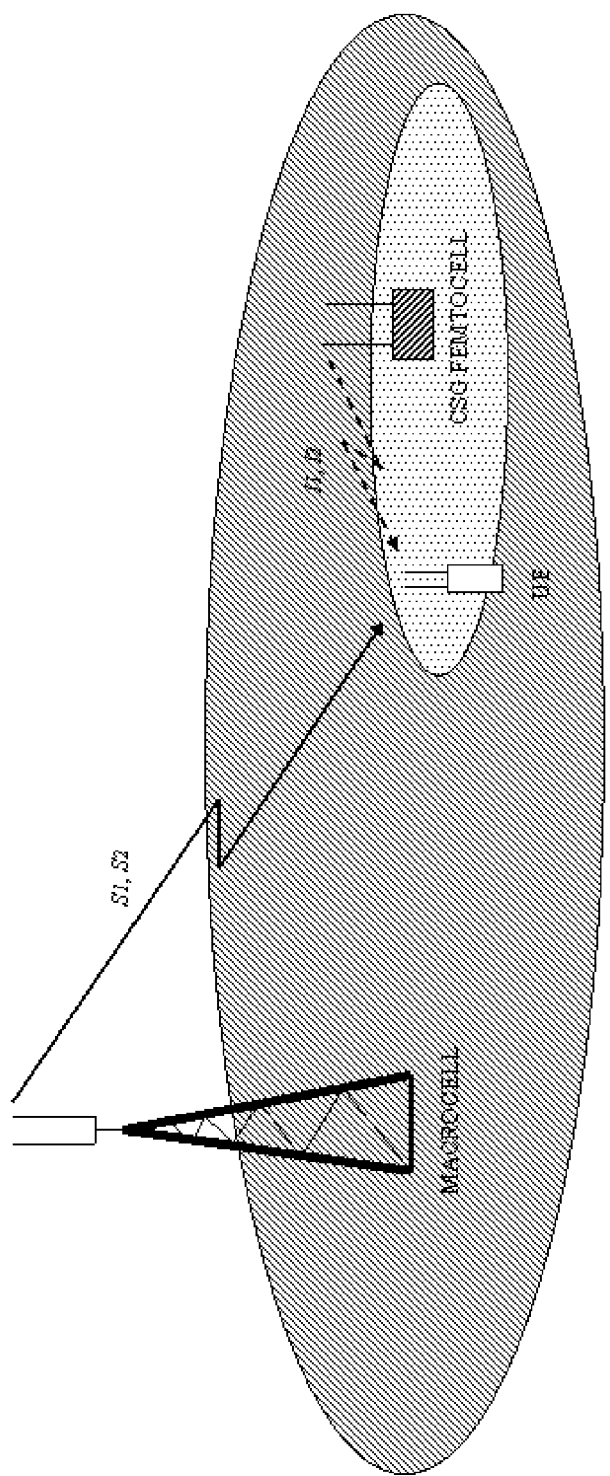
FIG. 5 shows the scenario of a UE connected to a macrocell and being interfered by an aggressor femtocell operating in CSG mode, according to an embodiment of the present invention.

Scenario 1: Victim UE Connected to a Macrocell and Suffering Interference from a CSG Femtocell Here a UE connected to a macrocell is interfered by an aggressor femtocell operating in CSG mode, which prevents him from performing a handover. FIG. 5 depicts this situation.

After power-on, the UE seeks for the macrocell PSS/SSS synchronization channels and experiences an increased interference from the femtocell. It is assumed that the UE gets connected to the macrocell by appropriate reception of control channels, with the aid of time-shifting, power attenuation or muting of the PDSCH REs, or any other suitable technique [5]. However, when a data connection starts, overlap of macro and femto PDSCH REs introduces heavy interference from the femtocell which may cause a radio link failure. The present invention thus proposes the following modifications in physical layer transmission and reception:

1. The macro eNB evaluates whether or not to apply the proposed interference cancellation scheme for a particular UE. This decision may be based upon RSRP/RSRQ measurements of the macrocell, the femtocell, or any other proprietary mechanism which detects a high interference level from the femtocell.
2. Upon activation of the proposed mechanism, the macro eNB informs the UE to report both the PCI and the number of transmit antennas of the femtocell. This may be accomplished through suitable modification of measurement reports, but for the present invention any procedure can be considered acceptable provided it reports both parameters to the macro eNB. Alternatively, only PCI may be requested and the macrocell will consider the worst case of a four antenna femtocell; this alleviates signaling at the cost of a very dense pattern of gaps even in single-antenna situations.
3. With this information, the macrocell knows the exact locations of femtocell CRS in time and frequency. Hence, upon establishment of a connection, the macro applies a DTX pattern over a subset of the REs reserved for the user which overlap with the femtocell CRS. The exact frequency positions depend on the PCI and the number of transmit antennas of the femtocell, and the time positions are also known due to the fixed time shift between the macro and femto.
4. The UE then exploits the DTX positions in order to estimate the transfer function(s) of the channel(s) between the UE receive antenna(s) and the femto transmit antenna(s). This estimation can be accomplished through appropriate interpolation over the relevant frequency band [8]. The corresponding channel matrix may be denoted as "interfering channel matrix". Estimation of the macro channel matrix can also be achieved with the aid of usual macro CRS; this channel matrix may be denoted as "serving channel matrix".
5. With the aid of both serving and interfering channel matrices, it is possible to consider a MIMO spatial multiplexing (SM) scenario between the macro TX antennas, the femto TX antennas and the UE RX antennas. The number of UE RX antennas shall be at least equal to the sum of the macro and femto TX antennas. Baseband processing for detection of the macro signals and rejection of interfering signals is explained in following section.

When only femtocell PCI is required (Step 2), the macro may obtain it from usual measurement reports performed by the UE under femtocell interference. In this case block 45 would be avoided (FIG. 4), and the macro assumes a four-antenna femtocell. However the UE must know it in order to apply the proposed interference cancellation mechanism.

Both the femtocell PCI and its number of antennas may be obtained by the UE through measurements. As the serving cell quality is poor in the presence of the femtocell, the UE will start to evaluate the femtocell RSRP/RSRQ [8]. This requires that the UE briefly synchronizes with the femtocell PSS/SSS channel, hence obtaining PCI. The UE may additionally obtain the number of femtocell transmit antennas through blind decoding of the femtocell MIB, which is broadcasted by PBCH [8]. Both PCI and number of antennas are needed by the UE in order to know the exact frequency locations of the femto CRS, in which DTX gaps will be applied.

After obtaining the interfering channel matrix, the victim UE may cancel femtocell interference regardless of the femto channel(s) overlapping with the macro data (be it PDSCH or other control channels). Therefore, it is possible to cancel out interference provided that the UE is equipped with enough number of antennas.

MIMO detection is in general more successful when the channel condition number K(H), measured as the ratio of the maximum and minimum singular values of the channel matrix, is close to 0 dB [9]. A well-conditioned channel matrix will have singular values of similar magnitudes, and in this case the system behaves as two independent SISO channels. Condition numbers greater than 10 dB are characteristic of ill-conditioned channel matrices, and should be avoided because the system will be more sensitive to estimation errors. Therefore the proposed scheme will be more effective when the SNRs of both serving and interfering channels are not very different, or the geometry value is close to 0 dB, but additional application of SIC techniques would also allow for operation with different serving and interfering power levels.

Proposed DTX Pattern for Scenario 1:

Although any configuration for DTX pattern is possible, several patterns are proposed in this invention depending on the number of femtocell TX antennas. The following cases assume that femtocell transmission is delayed 16 OFDM symbols with respect to macrocell transmission. It is also possible the opposite case, i.e. that the macrocell transmission is delayed with respect to the femtocell; in this case the proposed patterns in scenarios 1 and 2 should be exchanged.

Figure 6:
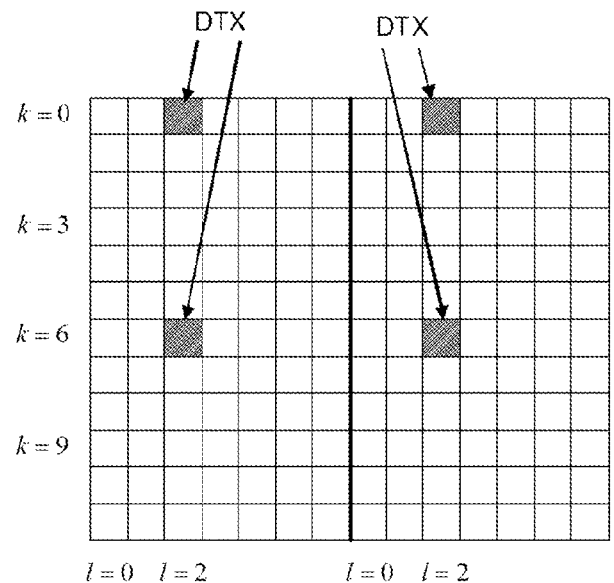
FIGS. 6 and 7 show the proposed DTX pattern for scenario 1 for the cases of a femtocell with one TX antenna for normal and extended prefix (CP) respectively, according to an embodiment of the present invention.
Figure 7:
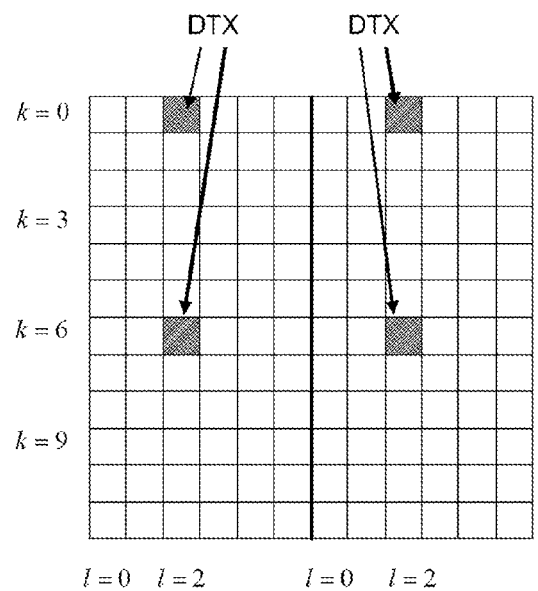

Case of Femtocell with One TX Antenna:

FIGS. 6 and 7 represent the proposed pattern of gaps. Only half density in time dimension is considered when compared with the corresponding CRS density, because low mobility conditions are assumed and excessive overhead is to be avoided. It is also noted that the time shift of two OFDM symbols relative to the subframe boundaries avoids overlap between DTX and macrocell CRS. As a consequence, this time offset is beneficial for the proposed invention in addition to help dealing with control channel interference between macro and femto.

The proposed DTX pattern shall be applied in resource elements (k, l) where k is the subcarrier index and l the symbol number within the slot, with the following values for both normal and extended CP:

$l=2$ $k=6m+N_{ID}^{femtocell} \bmod 6, m=0,1,\ldots,2 \cdot N_{RB}-1$

The parameter $N_{RB}$ represents the number of RBs assigned to the UE; thus the gaps will only be applied over the reserved RBs. The parameter $N_{ID}^{femtocell}$ stands for the femtocell PCI, hence a cell-dependent frequency shift is applied which is analogous to the corresponding frequency shift of the femtocell CRS. Thus, co-existence of different femtocells is possible in the same coverage region of the macrocell. Each femtocell will be characterised by different DTX patterns through different cell-specific frequency shifts (the figures assume the particular case of $N_{ID}^{femtocell} \bmod$ 6=0). As the DTX pattern is only applied over the RBs reserved for a particular user, it is possible to have different patterns for each of the femtocells under the coverage region of the macrocell.

As can be seen in FIGS. 6 and 7, the proposed pattern of gaps is not as dense as the femtocell CRS in the time dimension, in order to avoid excessive overhead. Hence the UE must be in low mobility conditions. In the frequency dimension the same density is maintained, so as to account for coherence bandwidths of the order of 45 kHz which are often encountered in highly dispersive channels [8].

Any other DTX pattern is also possible depending on particular implementation needs.

The described pattern of gaps shall be applied over all TX antennas in the macro eNB, in order to enable proper estimation of femtocell CRS.

Figure 8:
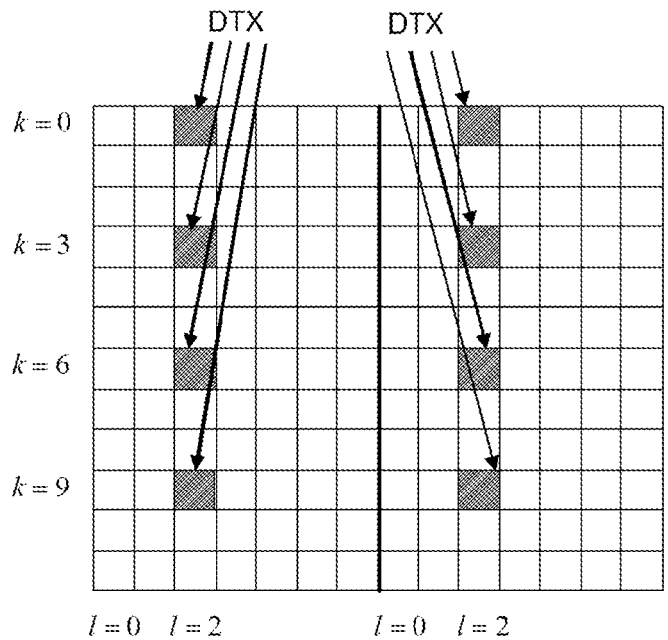
FIGS. 8 and 9 show the cases of a femtocell with two TX antennas for normal and extended prefix respectively, according to an embodiment of the present invention.
Figure 9:
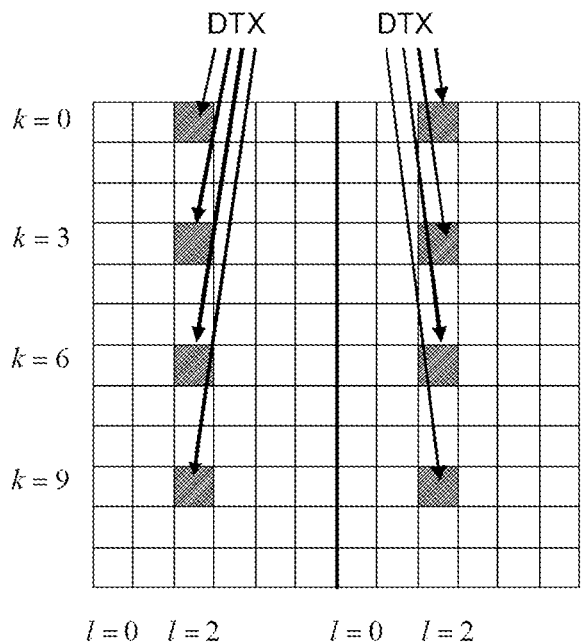

Case of Femtocell with Two TX Antennas:

FIGS. 8 and 9 depict the cases for normal and extended prefix, respectively. The four gaps in symbol 2 of each slot account for the two femtocell antenna transmissions.

The proposed DTX pattern shall be applied in resource elements (k, l) described by the following parameters:

$l=2$ $k=3m+N_{ID}^{femtocell} \bmod 3, m=0,1,\ldots,4 \cdot N_{RB}-1$

This is analogous to the case of one TX antenna, but with a doubled density of gaps in the frequency domain.

Figure 10:
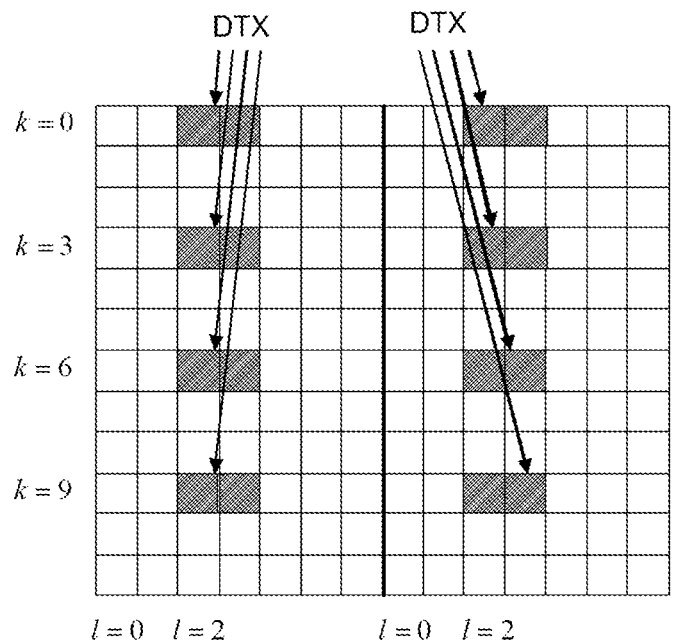
FIG. 10 depicts an example of a possible DTX pattern for the case of normal CP with four TX antennas.
Figure 11:
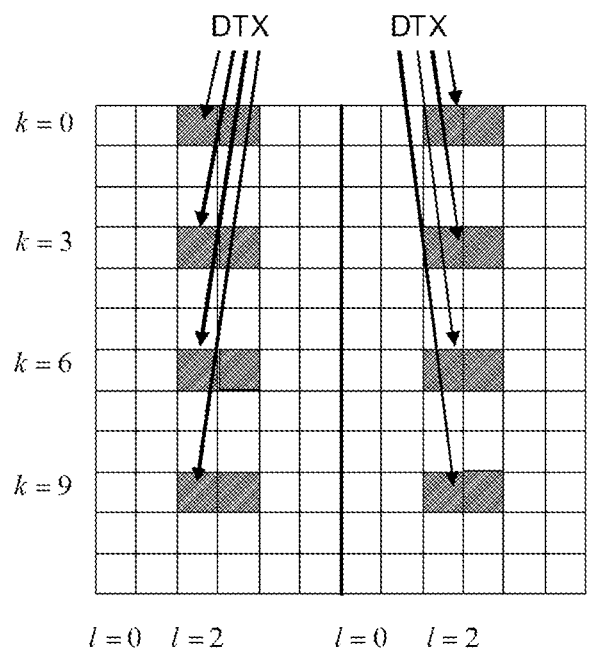
FIG. 11 depicts an example of a possible DTX pattern for the case of extended CP with four TX antennas.

Case of Femtocell with Four TX Antennas:

FIG. 10 depicts a possible DTX pattern for the case of normal CP, and FIG. 11 depicts the analogous pattern for the case of extended CP.

The proposed DTX pattern shall be applied in REs (k, l) characterised by the following parameters:

$l=2,3$ $k=3m+N_{ID}^{femtocell} \bmod 3, m=0,1,\ldots,4 \cdot N_{RB}-1$

It is seen that in this case additional gaps are reserved for estimation of CRS corresponding to the third and fourth TX femtocell antennas.

UE Baseband Processing for Interference Cancellation:

The DTX gaps can be exploited by the UE in order to estimate the channel transfer functions between the UE and the femtocell.

As an example, if it is considered a UE with four receive antennas where both macrocell and femtocell are transmitting with two antennas, in any of the available transmission modes. Given that the desired macrocell signals are denoted as $s_1$, $s_2$ and the femtocell interfering signals as $i_1$, $i_2$, the serving and interfering channel matrices are:

$$H^S = \begin{pmatrix} h_{11}^S & h_{12}^S \\ h_{21}^S & h_{22}^S \\ h_{31}^S & h_{32}^S \\ h_{41}^S & h_{42}^S \end{pmatrix},$$

$$H^I = \begin{pmatrix} h_{11}^I & h_{12}^I \\ h_{21}^I & h_{22}^I \\ h_{31}^I & h_{32}^I \\ h_{41}^I & h_{42}^I \end{pmatrix}.$$

The coefficients in $H^S$ may be obtained directly from macrocell CRS estimation and interpolation. With the aid of the above described DTX REs, the coefficients in $H^I$ may also be obtained.

The received signals from each of the antennas are expressed as:

$r_1 = h_{11}^S s_1 + h_{12}^S s_2 + h_{11}^I i_1 + h_{12}^I i_2,$ $r_2 = h_{21}^S s_1 + h_{22}^S s_2 + h_{21}^I i_1 + h_{22}^I i_2,$ $r_3 = h_{31}^S s_1 + h_{32}^S s_2 + h_{31}^I i_1 + h_{32}^I i_2,$ $r_4 = h_{41}^S s_1 + h_{42}^S s_2 + h_{41}^I i_1 + h_{42}^I i_2.$

In matrix notation:

$$\begin{pmatrix} r_1 \\ r_2 \\ r_3 \\ r_4 \end{pmatrix} = \begin{pmatrix} h_{11}^S & h_{12}^S & h_{11}^I & h_{12}^I \\ h_{21}^S & h_{22}^S & h_{21}^I & h_{22}^I \\ h_{31}^S & h_{32}^S & h_{31}^I & h_{32}^I \\ h_{41}^S & h_{42}^S & h_{41}^I & h_{42}^I \end{pmatrix} \cdot \begin{pmatrix} s_1 \\ s_2 \\ i_1 \\ i_2 \end{pmatrix}$$

This forms a matrix equation for which usual MMSE or ML detection techniques may be applied. Moreover, as only the macrocell signals $s_1$, $s_2$ are desired, iterative (SIC-like) procedures may be applied in order to remove the interfering signals $i_1$, $i_2$.

Hence a baseline LTE-A receiver with four receive antennas will be capable of removing two-antenna interference signals out of a compound desired-plus-interference signal, employing usual MIMO detection techniques. In a general case, given $N_T^{macro}$ transmit macro antennas and $N_T^{femto}$ transmit femto antennas, a UE with a minimum of $M = N_T^{macro} + N_T^{femto}$ receive antennas will be able to properly cancel interference with the general procedure described above. Given that the system is well-conditioned and the number of receive antennas is higher than (or equal to) the rank of the system, proper demodulation is possible. A higher number of receive antennas will aid in the demodulation process thus bringing additional receive diversity to the detection.

Figure 12:
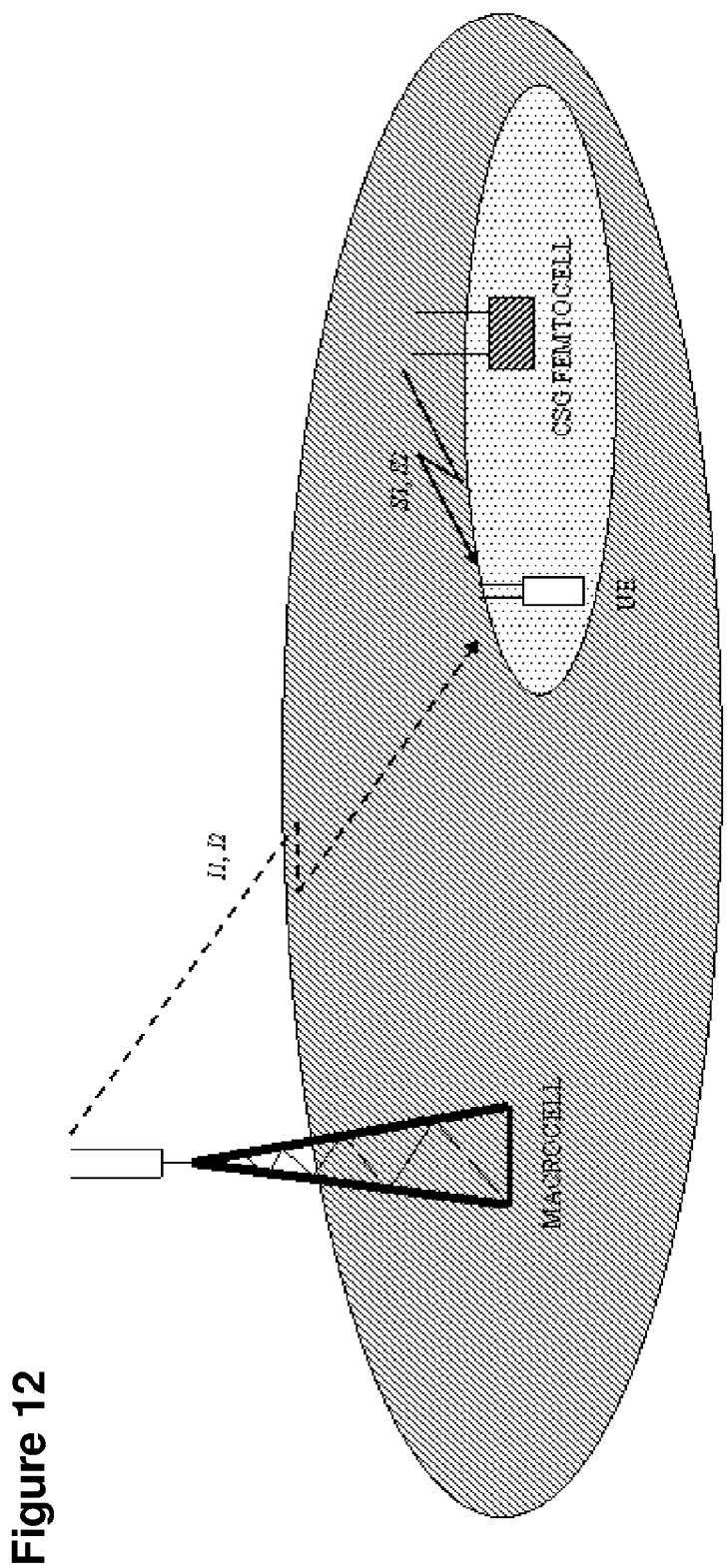
FIG. 12 shows the scenario of a UE connected to a femtocell and being interfered by an aggressor macrocell, according to an embodiment of the present invention.

Scenario 2: Victim UE Connected to a Femtocell and Suffering Interference from a Macrocell In this Scenario, a UE connected to a femtocell (also known as Home-eNB) is suffering from aggressor macrocell interference. This situation appears especially under femtocell cell range expansion. FIG. 12 represents the scenario in this case.

The aggressor in this case is the macrocell. As in Scenario 1, the femtocell needs to be aware of both the macro identity and number of antennas. There are in this case two alternatives to obtain them:

As in Scenario 1, UEs under heavy macro interference will measure macrocell RSRP/RSRQ. This requires a brief synchronization with the macrocell, hence obtaining its PCI from the PSS/SSS. Additionally, it is possible to blindly decode MIB from the macro PBCH and obtain the number of antennas. Both PCI and number of antennas may be sent to the Home-eNB through appropriate modification of a measurement report, or by any other suitable mechanism. This alternative is sub-optimal as all UEs will in general see the same macrocell information, thus incurring in an excessive signaling overhead towards the femtocell.

Another SON-like possibility is that, after power-on, the femtocell scans the downlink interfering signals and decodes the relevant macro parameters. This has the advantage of not requiring measurements at the UE. Other alternatives include semi-static configuration through X2 interface (if available), but are more costly.

It is possible that the UE avoids reporting the number of antennas of the macrocell, as in Scenario 1. In this case the femtocell will assume four-antenna macro transmissions.

Assuming that the femtocell knows the macro parameters, it applies the appropriate DTX pattern over the REs reserved for the UEs which suffer from heavy macrocell interference. These UEs take advantage of DTX and construct both the serving and interfering channel matrices as explained before. With this information it is possible to reject interference provided that enough receive antennas are available at the UE.

Proposed DTX Pattern for Scenario 2:

Similar to Scenario 1, there appear several cases depending on the number of TX antennas in the macro cell. Again it is assumed that the femtocell transmission is delayed 16 OFDM symbols with respect to the macrocell.

Figure 13:
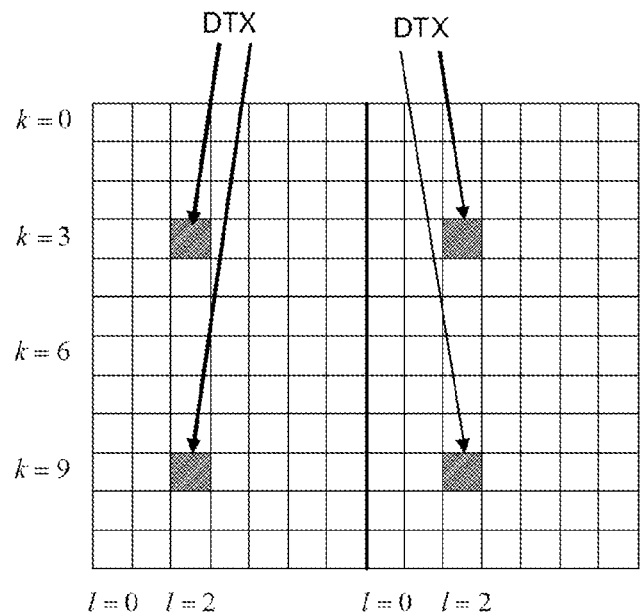
FIGS. 13 and 14 show the proposed DTX pattern for scenario 2 for the cases of a macrocell with one TX antenna for the cases of normal and extended CP respectively, according to an embodiment of the present invention.
Figure 14:
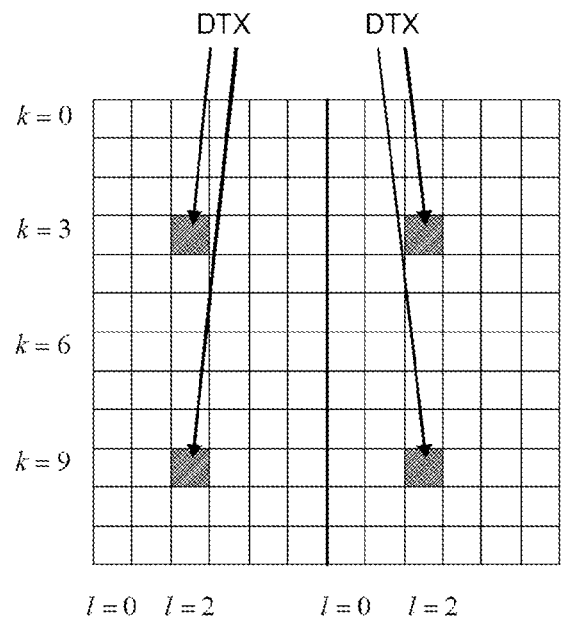

Case of Macrocell with One TX Antenna:

FIGS. 13 and 14 depict the proposed pattern for the cases of normal and extended CP, respectively. They are similar to FIGS. 6 and 7, but with a relative frequency shift of 3 REs due to overlapping with the macro CRS of the fourth symbol in each slot. The figures assume the particular case of $N_{ID}^{macrocell} \mod 6 = 0$, where the parameter $N_{ID}^{macrocell}$ stands for the macro cell PCI.

Figure 15:
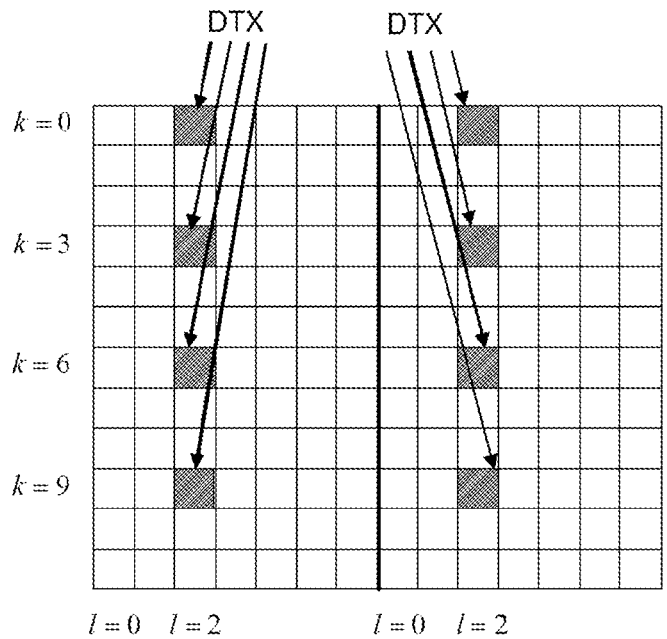
FIGS. 15 and 16 show the cases of a macrocell with two TX antennas for normal and extended prefix respectively, according to an embodiment of the present invention.
Figure 16:
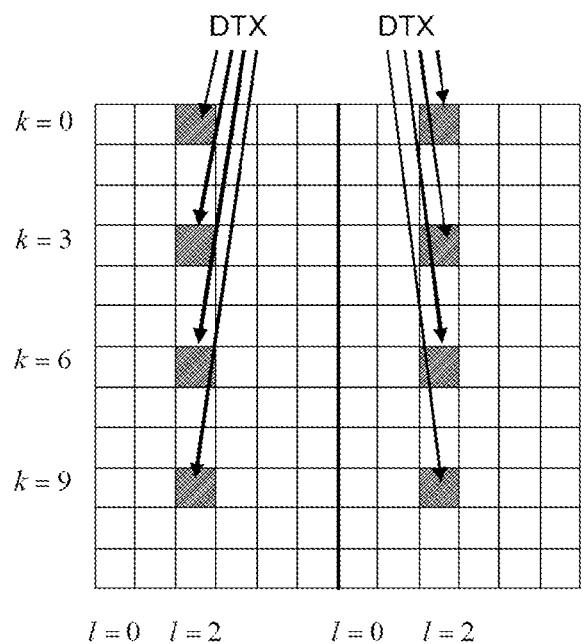

The expression for the proposed DTX pattern in resource elements (k, l) for both normal and extended CP is:

$l = 2$ $k = 6m + (N_{ID}^{macrocell} + 3) \mod 6, m = 0, 1, \ldots, 2 \cdot N - 1$ Case of Macrocell with Two TX Antennas:

This case is analogous to the one in Scenario 1 and presents the same DTX pattern, as depicted in FIGS. 15 and 16.

Figure 17:
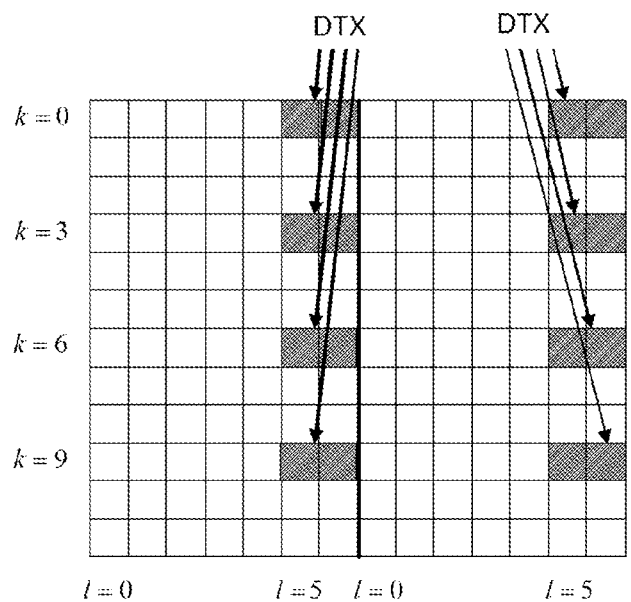
FIG. 17 depicts an example of a possible pattern for the case of normal CP with four TX antennas.
Figure 18:
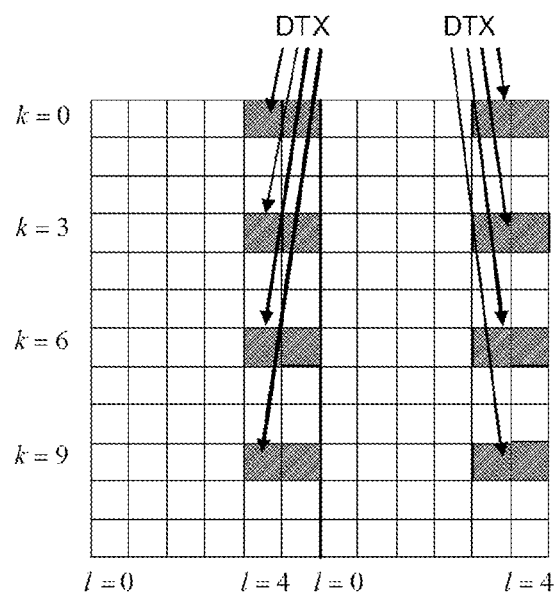
FIG. 18 depicts an example of a possible pattern for the case of extended CP with four TX antennas.

The proposed DTX pattern shall be applied in resource elements (k, l) with the following parameters for both normal and extended CP:

$l = 2$ $k = 3m + N_{ID}^{macrocell} \mod 3, m = 0, 1, \ldots, 4 \cdot N_{RB} - 1$ Case of Macrocell with Four TX Antennas FIG. 17 depicts a possible DTX pattern for the case of normal CP, and FIG. 18 depicts the analogous pattern for the case of extended CP. These are similar to FIGS. 10 and 11 of Scenario 1, but with a time shift of three and two OFDM symbols, respectively.

The proposed DTX pattern shall be applied in resource elements (k, l) described by the following parameters:

Normal CP:

$l = 5, 6$ $k = 3m + N_{ID}^{macrocell} \mod 3, m = 0, 1, \ldots, 4 \cdot N_{RB} - 1$ Extended CP:

$l = 4, 5$ $k = 3m + N_{ID}^{macrocell} \mod 3, m = 0, 1, \ldots, 4 \cdot N_{RB} - 1$ UE Baseband Processing for Interference Cancellation:

The UE estimates both serving (femtocell) and interfering (macrocell) channel matrices, and applies any of the usual MIMO detection techniques to extract the desired components.

eNodeB/Home-eNodeB Baseband Processing

In both Scenarios the eNodeB and the Home-eNodeBs must change baseband PDSCH processing in order to introduce the DTX patterns. Three fundamental changes should take place:

The Resource Element Mapper function should change so as to incorporate the described DTX gaps on the relevant REs [10].

The Rate Matching function should take into account the reduction in available REs for DL-SCH due to the DTX pattern, thus increasing the effective code rate [11].

A new PDCCH format should be introduced informing the UE of the application of the proposed DTX pattern over the relevant REs [11].

These changes are not treated by the present invention, and any means for performing them will be considered suitable as long as they achieve the objectives described in the invention.

Figure 19:
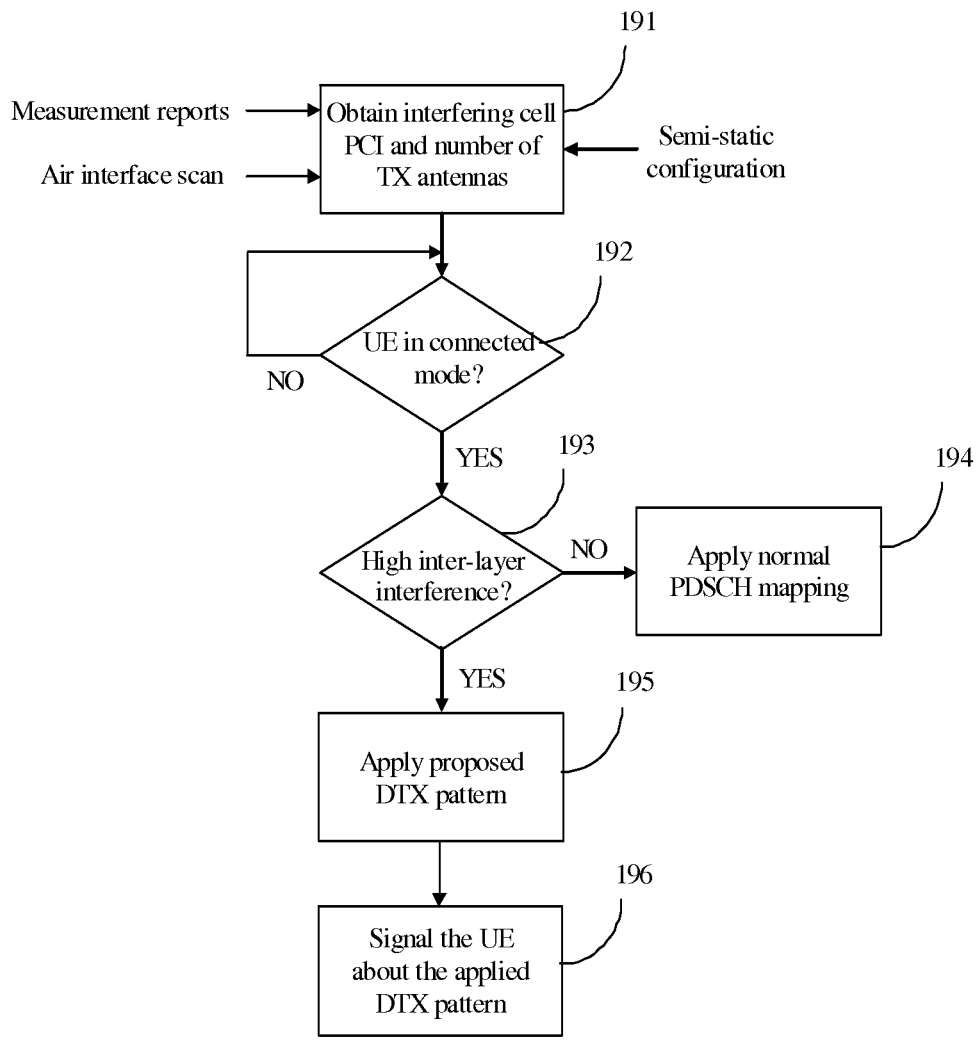
FIG. 19 shows a preferred embodiment of the proposed invention for the eNodeB/Home-eNB.

FIG. 19 shows a preferred embodiment of the proposed invention for the eNodeB/Home-eNodeB.

Block (191) is responsible for obtaining the interfering cell's PCI and number of transmit antennas. These may be obtained through appropriate UE measurement reports, as well as air interface scanning or semi-static configuration via X2 interface; alternatively, only PCI is needed and four-antenna transmission is assumed. With these parameters, block (192) waits for the UE to enter RRC connected mode, and upon entering it block (193) evaluates the presence of a high inter-layer interference. If no excessive interference is detected the system applies normal PDSCH mapping (block 194). On the contrary, if a high interference is detected the proposed DTX pattern is applied in order to enable interference cancellation by the UE (block 195). Finally the eNB/Home-eNodeB appropriately signals the UE about the applied DTX pattern (block 196), through e.g. any suitable modification of the DL scheduling information in PDCCH [11].

Figure 20:
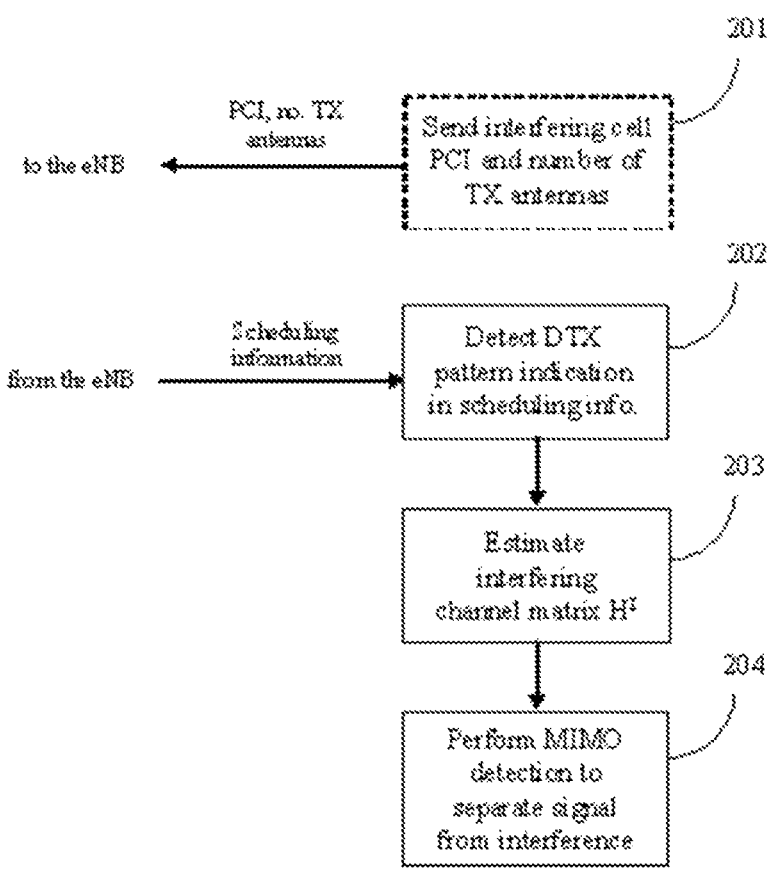
FIG. 20 shows a preferred embodiment of the proposed invention for the UE.

FIG. 20 shows a preferred embodiment of the proposed invention for the UE.

Block (201) (shown in dashed lines) optionally sends the interfering cell's PCI and number of transmit antennas to the eNB/Home-eNB. This information may be included as a part of the existing measurement reports, or by means of any other signaling message. If this information is not sent by the UE, the eNB shall obtain it with the aid of air interface scanning or semi-static configuration via X2 interface. When the eNB/Home-eNB sends appropriate DL scheduling information to the UE, block (202) detects the DTX pattern indication (e.g. by using a different DCI format [11]). Block (203) estimates the interfering cell's transfer matrix by taking advantage of the DTX gaps. Block (204) finally performs suitable MIMO detection (such as MMSE-SIC) in order to separate the desired and interfering signals.

The blocks depicted in FIGS. 19 and 20 may be implemented as a collection of software elements, hardware elements, firmware elements, or any combination of them.

Advantages of the Invention

The proposed invention deals with inter-layer interference in the context of heterogeneous networks. Given that terminal receivers incorporate several antennas for MIMO detection, application of the proposed DTX patterns in PDSCH transmissions enable cancellation of downlink interference with minimal added computation complexity for the UEs.

The proposed scheme is less complex than other discussed alternatives, which usually involve interactions between layers and complex coordination mechanisms for inter-layer frequency- or time-partitioning. Additionally, successive interference-cancellation (SIC) receivers only operate at very low (or very high) SINR conditions, precluding its use when geometry values are close to 0 dB, in addition to being computationally demanding. In contrast, the present invention may be more successful in removing interference when the geometry is close to 0 dB, which happens usually in cell-edge conditions, and demands lower computation resources from the UEs.

Interference cancellation is nowadays the main obstacle for massive deployment of heterogeneous networks, which are in general considered the best way of increasing capacity and cope with the increasing demand in bitrates created by modern data-hungry applications.

Cell-edge behaviour mainly determines global coverage and capacity, therefore an enhanced interference management results in a direct reduction in CAPEX and OPEX through more efficient network deployments.

A person skilled in the art could introduce changes and modifications in the embodiments described without departing from the scope of the invention as it is defined in the attached claims.

ACRONYMS

3G Third Generation
3GPP Third Generation Partnership Project
ABSF Almost Blank Subframe
CAPEX Capital Expenditure
CP Cyclic Prefix
CRE Cell Range Expansion
CRS Cell Reference Signal
CSG Closed Subscriber Group
DTX Discontinuous Transmission
eICIC Enhanced Inter-Cell Interference Coordination
FFR Fractional Frequency Reuse
GSM Global System for Mobile Communications
HeNB Home eNode B
HetNet Heterogeneous Network
ICIC Inter-Cell Interference Coordination
IMT International Mobile Telecommunications
LTE Long Term Evolution
LTE-A Long Term Evolution-Advanced
MIB Master Information Block
MIMO Multiple Input Multiple Output
ML Maximum Likelihood
MMSE Minimum Mean Squared Error
OFDM Orthogonal Frequency Division Multiplexing
OPEX Operational Expenditure
PBCH Physical Broadcast Channel
PCFICH Physical Control Format Indicator Channel
PCI Physical Cell Identity
PDCCH Physical Downlink Control Channel
PDSCH Physical Downlink Shared Channel
PHICH Physical HARQ Indicator Channel
PIC Parallel Interference Cancellation
PRB Physical Resource Block
PSS Primary Synchronization Channel
RAT Radio Access Technology
RB Resource Block
RE Resource Element
RSRP Reference Signal Received Power
RSRQ Reference Signal Received Quality
SIC Successive Interference Cancellation
SINR Signal to Interference plus Noise Ratio
SISO Single Input Single Output SM Spatial Multiplexing
SNR Signal to Noise Ratio
SON Self-Optimising Network
SSS Secondary Synchronization Channel
UE User Equipment
UMTS Universal Mobile Telecommunication System

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)
[2] A. Damnjanovic et al, "A Survey on 3GPP Heterogeneous Networks", IEEE Wireless Communications, June 2011
[3] J. Ketonen and M. Juntti, "SIC and K-BEST LSD receiver implementation for a MIMO-OFDM System," Proc. European Signal Processing Conference, 2008
[4] USPTO Patent Application US2010/0208854 A1, "IIterative Interference Cancellation for MIMO-OFDM Receivers"
[5] 3GPP TR 36.921 v10.0.0, Evolved Universal Terrestrial Radio Access (E-UTRA); FDD Home eNode B (HeNB) Radio Frequency (RF) requirement analysis (Release 10)
[6] D. López-Pórez et al, "Enhanced Intercell Interference Coordination Challenges in Heterogeneous Networks", IEEE Wireless Communications, June 2011
[7] 3GPP TSG RAN R1-106186, "Control Channel ICIC for macro-femto deployments", NTT Docomo, November 2010
[8] S. Sesia, I. Toufik, M. Baker (editors), "LTE, the UMTS Long Term Evolution: From Theory to Practice", John Wiley & Sons, 2009
[9] "MIMO Performance and Condition Number in LTE Test", Agilent Technologies, Application Note
[10] 3GPP TS 36.211, Evolved Universal Terrestrial Radio Access (E-UTRA); "Physical Channels and Modulation (Release 10)"
[11] 3GPP TS 36.212, Evolved Universal Terrestrial Radio Access (E-UTRA); "Multiplexing and Channel Coding (Release 10)"
[12] A. Rüegg, A. Tarable, "IIterative SIC receiver scheme for non-orthogonally superimposed signals on top of OFDMA", IEEE 21st International Symposium on Personal Indoor and Mobile Radio Communications (PIMRC), September 2010

The invention claimed is:

1. A method for cancelling downlink interference in a LTE-Advanced network, comprising at least one user device provided with at least four antennas, wirelessly connected to a serving base station having between one and four transmit antennas and suffering interferences from at least one interfering base station having between one and four transmit antennas, establishing a data transmission link among a plurality of antennas, wherein transmissions of said serving base station and said at least one interfering base station are time-synchronized, the method comprising:
applying a relative time shift delay of one subframe plus two Orthogonal Frequency Division Multiplexing (OFDM) symbols between the transmissions of said serving base station and said at least one interfering base station in order to avoid collision between Cell Reference Signals (CRS) of said serving base station and said at least one interfering base station when said data transmission is established;
obtaining a number of transmit antennas and a physical cell identity ($N_{ID}^{int\ erf}$) of said interfering base station; and
introducing changes on a physical layer of said serving base station for Physical Downlink Shared Channel (PDSCH) transmission and reception, aimed at achieving inter-layer interference cancellation, said introduced changes comprising an introduction of a pattern of transmission gaps at symbols (l) and subcarrier indices (k) of said at least one interfering base station's CRS signals over resource blocks reserved for a particular user device ($N_{RB}$), wherein positions of said transmission gaps depend on a number of transmit antennas and the physical cell identity of said at least one interfering base station, which will be exploited by said at least one user device for effective interference cancellation.

2. The method according to claim 1, wherein said at least one interfering base station has one of said transmit antenna, and the serving base station applies a Discontinuous Transmission (DTX) pattern at resource elements RE(k, l) given by the following equations:

$l=2$ $k=6m+N_{ID}^{int\ erf}\ \mathrm{mod}\ 6, m=0,1,\ldots,2\cdot N_{RB}-1.$

3. The method according to claim 1, wherein said at least one interfering base station has two of said transmit antennas, and the serving base station applies a DTX pattern at resource elements RE(k, l) given by the following equations:

$l=2$ $k=3m+N_{ID}^{int\ erf}\ \mathrm{mod}\ 3, m=0,1,\ldots,4\cdot N_{RB}-1.$

4. The method according to claim 1, wherein said at least one interfering base station has four of said transmit antennas, and the serving base station applies a DTX pattern at resource elements RE(k, l) given by the following equations:

$l=2,3$ $k=3m+N_{ID}^{int\ erf}\ \mathrm{mod}\ 3, m=0,1,\ldots,4\cdot N_{RB}-1.$ 5. The method according to claim 1, wherein said at least one interfering base station has one of said transmit antenna, and the serving base station applies a DTX pattern at resource elements RE(k, l) given by the following equations:

$l=2$ $k=6m+(N_{ID}^{int\ erf}+3)\ \mathrm{mod}\ 6, m=0,1,\ldots,2\cdot N_{RB}-1.$ 6. The method according to claim 1, wherein said at least one interfering base station has two of said transmit antennas, and the serving base station applies a DTX pattern at resource elements RE(k, l) given by the following equations:

$l=2$ $k=3m+N_{ID}^{int\ erf}\ \mathrm{mod}\ 3, m=0,1,\ldots,4\cdot N_{RB}-1.$

7. The method according to claim 1, wherein said at least one interfering base station has four of said transmit antennas, and the serving base station applies a DTX pattern at resource elements RE(k, l) given by the following equations:
In the case of normal Cyclic Prefix (CP):

$l=5,6$ $k=3m+N_{ID}^{int\ erf}\ \mathrm{mod}\ 3, m=0,1,\ldots,4\cdot N_{RB}-1;$ In the case of extended CP:

$l=4,5$ $k=3m+N_{ID}^{int\ erf} \mod 3, m=0,1,\ldots,4\cdot N_{RB}-1.$

8. The method according to claim 1, further comprising receiving, by said serving base station, a serving and an interfering quality measurement report including a Reference Signal Received Power (RSRP) and a Reference Signal Received Quality (RSRQ) from said at least one user device.

9. The method according to claim 1, wherein said serving base station is a macro cell and said at least one interfering base station is a small cell.

10. The method according to claim 1, wherein said serving base station is a small cell and said at least one interfering base station is a macro cell.

\* \* \* \* \*